(12) United States Patent
Rogers

(10) Patent No.: US 11,758,122 B1
(45) Date of Patent: Sep. 12, 2023

(54) LENS AND CAMERA TESTING METHOD, APPARATUS, AND SYSTEM

(71) Applicant: Norman Rogers, Las Vegas, NV (US)

(72) Inventor: Norman Rogers, Las Vegas, NV (US)

( * ) Notice: Subject to any disclaimer, the term of this patent is extended or adjusted under 35 U.S.C. 154(b) by 0 days.

(21) Appl. No.: 18/145,365

(22) Filed: Dec. 22, 2022

Related U.S. Application Data

(60) Provisional application No. 63/297,151, filed on Jan. 6, 2022.

(51) Int. Cl.
*H04N 17/02* (2006.01)
*H04N 17/00* (2006.01)
*G01M 11/02* (2006.01)
*H04N 23/695* (2023.01)

(52) U.S. Cl.
CPC ...... *H04N 17/002* (2013.01); *G01M 11/0242* (2013.01); *H04N 23/695* (2023.01)

(58) Field of Classification Search
CPC .......... H04N 17/002; H04N 23/695; G01M 11/0242
USPC .......................................... 348/187
See application file for complete search history.

(56) References Cited

U.S. PATENT DOCUMENTS

| | | | |
|---|---|---|---|
| 10,165,263 B2 * | 12/2018 | Tezaur | H04N 17/002 |
| 10,965,875 B2 * | 3/2021 | Guo | G03B 17/561 |
| 11,399,122 B2 * | 7/2022 | Huang | G03B 3/10 |
| 11,557,106 B2 * | 1/2023 | Di | G06F 3/0416 |
| 2016/0061594 A1 * | 3/2016 | Kim | G01M 11/0214 |
| | | | 348/302 |
| 2018/0103209 A1 * | 4/2018 | Fischler | H04N 23/64 |

* cited by examiner

*Primary Examiner* — Trang U Tran
(74) *Attorney, Agent, or Firm* — Heimlich Law, PC; Alan Heimlich, Esq.

(57) ABSTRACT

A Lens and Camera Testing Method, Apparatus, and System have been disclosed. In one implementation a lens and camera combination is mounted on a gimbal and is tilted at a remote polygon target.

6 Claims, 7 Drawing Sheets

LENS AND CAMERA TESTING METHOD, APPARATUS, AND SYSTEM

RELATED APPLICATION

The present Application for Patent is related to U.S. Patent Application No. 63/297,151 titled "Lens and Camera Testing Method, Apparatus, and System" filed Jan. 6, 2022 pending by the same inventor which is hereby incorporated herein by reference.

FIELD OF THE INVENTION

The present invention pertains to lenses and camera. More particularly, the present invention relates to Lens and Camera Testing Method, Apparatus, and System.

BACKGROUND OF THE INVENTION

In large part the performance of a digital camera is a function of the camera lens and the camera sensor. That is, while they may be individual components manufactured with their own associated tolerances, in combination they determine the performance of a digital camera. Thus, what is needed is a combined performance of a camera and lens. While it is possible to examine the lens factors and camera sensor factors independently that does not yield a best result, because other factors are not accounted for. For example, a lack of parallelism of the lens and sensor, especially important for removeable lens cameras where there are mating flanges on the lens and camera.

This presents a technical problem for which a technical solution using a technical means is needed.

BRIEF DESCRIPTION OF THE DRAWINGS

The techniques disclosed are illustrated by way of examples and not limitations in the figures of the accompanying drawings. Same numbered items are not necessarily alike.

DETAILED DESCRIPTION

A Lens and Camera Testing Method, Apparatus, and System is disclosed.

Overview of the Invention

The performance of a digital camera is a function of the camera lens and the camera sensor. This invention tests the combined performance of a camera and lens. However, if it is desired to examine the lens factors and camera sensor factors independently that can be done since the effects of the camera and lens are different in nature. An additional fault that can be detected is a lack of parallelism of the lens and sensor, especially important for removeable lens cameras where there are mating flanges on the lens and camera.

The components of a digital camera that are most relevant to the quality of the photos produced are the lens and the sensor. The lens creates an image on the sensor. The sensor is an array of pixels, often between 20 million and 100 million, that make up the photo. Usually there are red, green and blue sensitive pixels to enable taking color photographs.

If the lens were perfect the resolution would only be limited by the density of pixels in the sensor. However, there are no perfect lenses. A high-quality lens produces photos that are sharp, clearly displaying small details in the image. This is often described as good resolution, good acutance or good frequency response. These terms are all similar in meaning.

Manufacturing modern, high-quality camera lenses is difficult due to the extreme manufacturing tolerances involved. It is very common for a consumer to receive a lens from a reputable manufacturer that is significantly below average in quality. This invention is aimed at providing a practical and inexpensive method of testing the quality of lenses and lens-camera combinations at the retail or end user level. The traditional methods of testing lenses involve special and expensive equipment.

The quality of a photo is not uniform but varies over the field of view. Usually, resolution is best in the center of the photo but becomes poorer as one moves away from the center. Often resolution is very poor in the corners. In order to characterize the quality of a lens it is important to measure quality or resolution at a collection of points in the field of view.

In theory the resolution should be symmetric about the center of the picture. But if the lens is not mechanically square with respect to the sensor, the symmetry may be broken and resolution may be better on one side or the other of the photo. The testing measure described here also detects broken symmetry.

The method described here uses a target with a series of sharply defined edges oriented at different angles. The degree to which the sharp edges are softened or blurred by the lens can be used to characterize the lens at the point where the target is positioned in the field of view.

Figure 1:
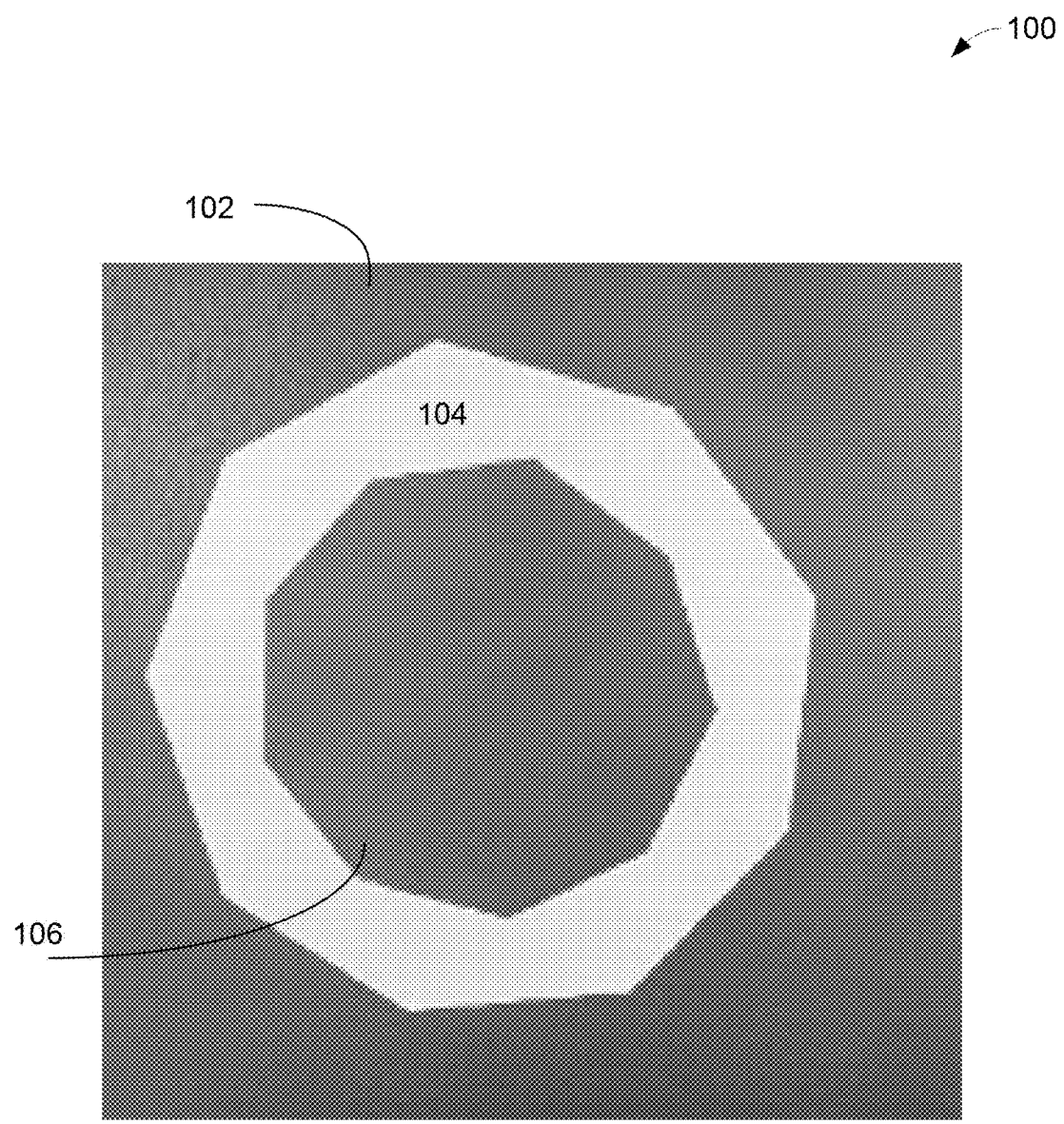
FIG. 1 illustrates nested polygons.

FIG. 1 illustrates, generally at 100, an embodiment of a representative target found to be useful consisting of nested polygons. At 102 is shown an outer target, having a cutout of a first polygon 104, and a second polygon 106 that is nestled within the area of the first polygon 104.

The image of the target is much smaller than the field of view. In order to test the lens at different points in the field of view the target image is positioned at the desired measurement point by tilting and swinging the camera.

Figure 2:
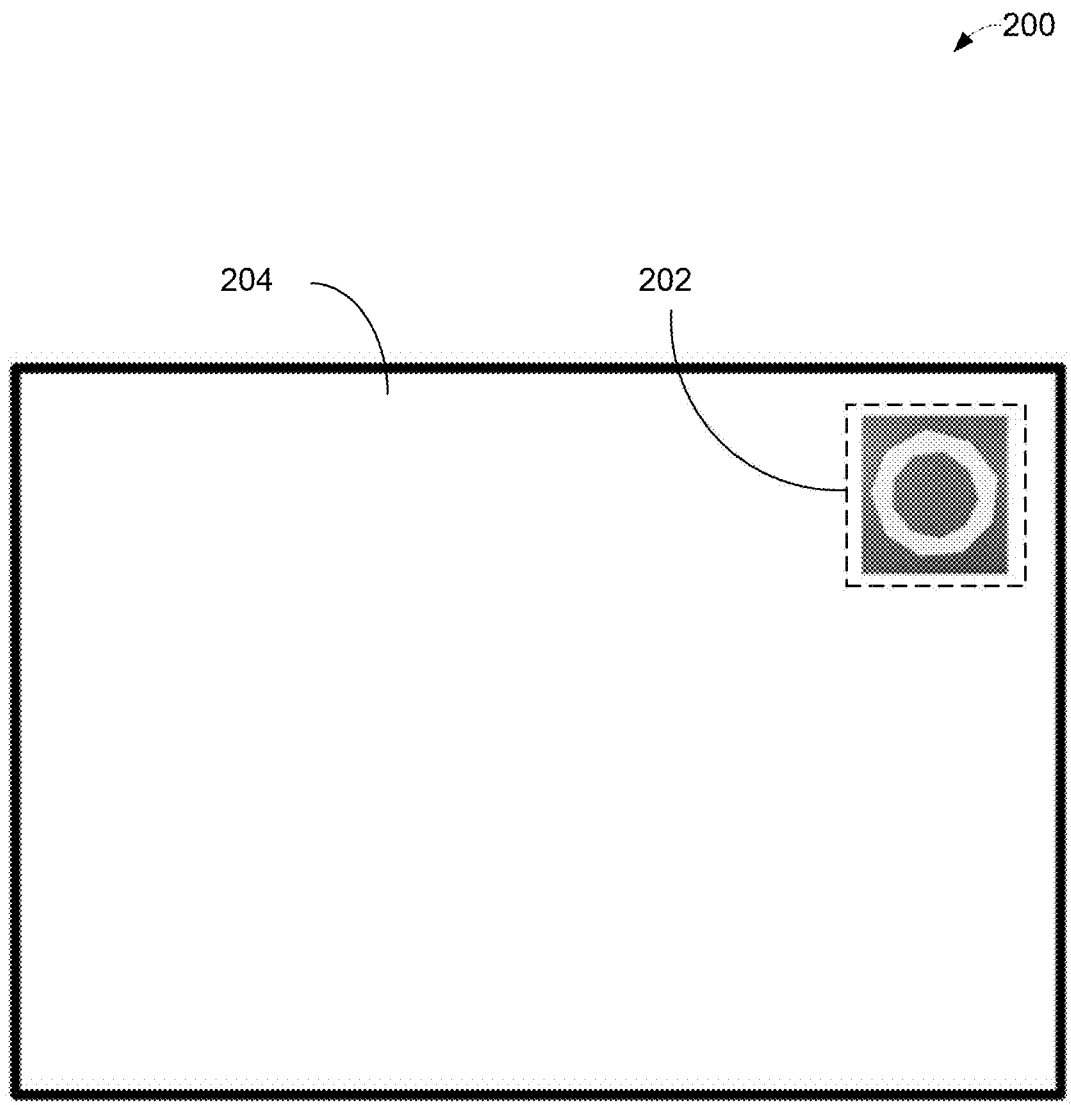
FIG. 2 illustrates a target in a field of view.

FIG. 2 illustrates, generally at 200, an embodiment showing the target 202 (enclosed by a dashed box) positioned near the upper right corner of the field of view 204.

Tilting and swinging the camera (using a common photographer's device called a gimbal) is a novel approach to setting a target at different points in the field of view. A challenge with this approach is that the size, aspect ratio and sharpness of focus change as the tilt and swing are changed. However, this disclosure describes techniques for compensating for such.

Figure 3:
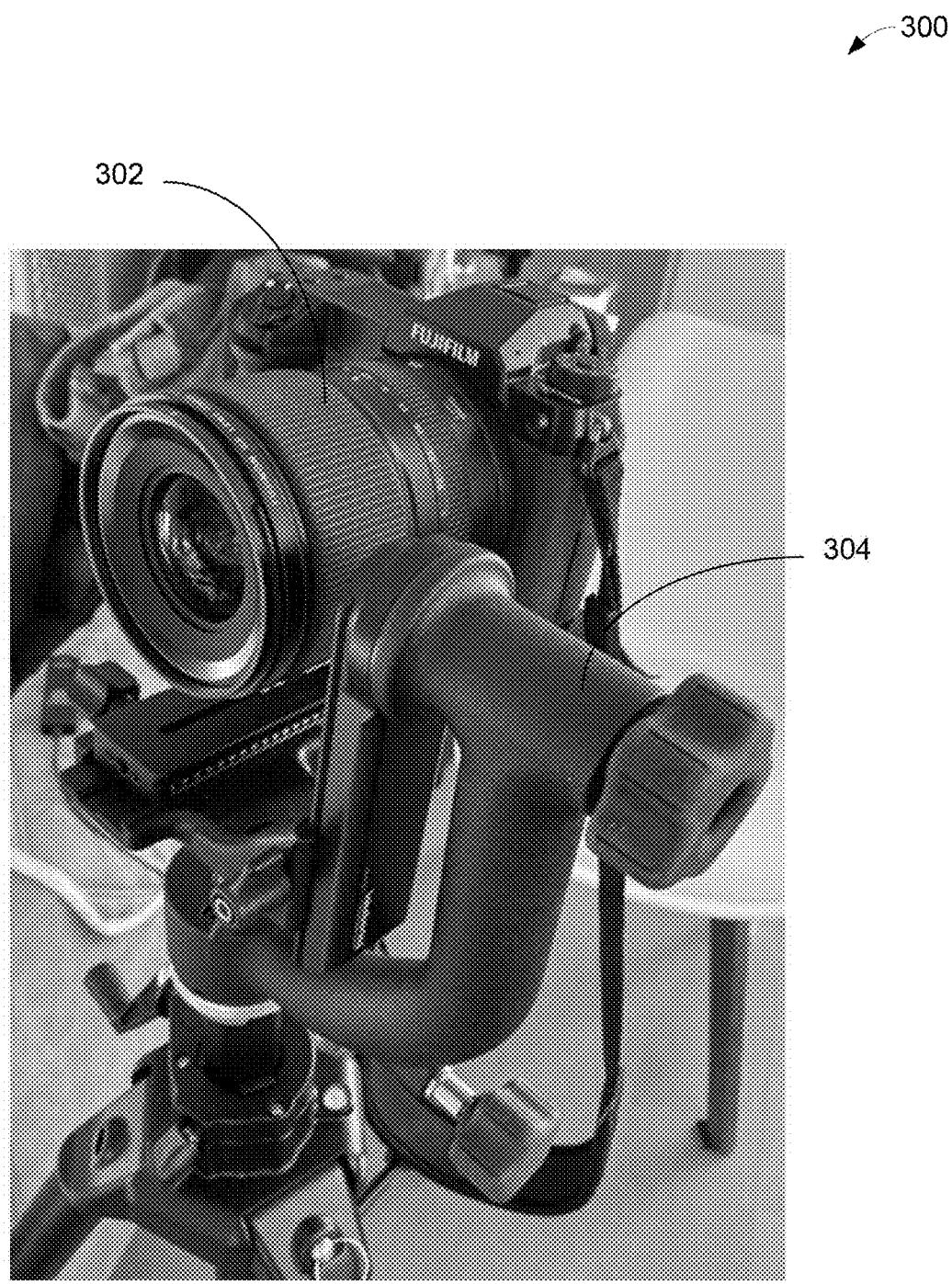
FIG. 3 illustrates a camera mounted on a gimbal.

FIG. 3 illustrates, generally at 300, an embodiment showing a camera 302 mounted on a gimbal 304.

The techniques described herein improve upon the traditional methods of accomplishing targets positioned at various points in the field of view. The most common traditional scheme is a rectangular frame containing images of the target at various points. In this case the array of targets quickly becomes prohibitively large as the distance from the camera increases. Even if an entire wall 3 meters high is covered with targets the camera can't be very far away from the wall and still have the array of targets fill the camera's view. The limitation of this method is that the camera focus distance has to be short enough that the size of the target frame is not overwhelming. Yet it is desirable to test lenses focused at or near infinity.

Camera lenses can be focused from a few inches to a few feet from the camera to distant targets. Targets further away than about 50 times the camera lens focal length, depending on the type of lens, are considered as focused at infinity. Camera lenses are often benchmarked focused on infinity. Of course, the target cannot be placed at infinity or even 50 meters, because it would become impracticably large. A novel approach of this invention is to optically make the target appear to be far away from the camera.

The traditional method of optically moving the array of targets to distant or near infinity is an optical collimator. The collimator presents a virtual image of the target to the camera. In some cases, multiple collimating lenses are used to present targets at different angles from the optical axis of the camera lenses. The aberrations of the collimator lenses contaminate the measurements. As a consequence, very high optical and mechanical precision is required for the collimator setup and such a setup can easily cost $50,000. The techniques described herein also obsolete the need for an optical bench with a precision lens close to the target to create an image of the target that appears to be at infinity, rather the approach disclosed here is quite different. In this invention an "auxiliary lens" is used to create a virtual image of the target that appears to the camera as a distant target. Further, and this is very novel, the auxiliary lens is not attached to the camera and does not move when the camera tilts and swings. The auxiliary lens can be a simple lens, for example plano-convex with a long focal length of, for example 4 meters. Because the auxiliary lens is weak (long focal length) it introduces small additional lens aberrations that are easy to compensate for.

Figure 4:
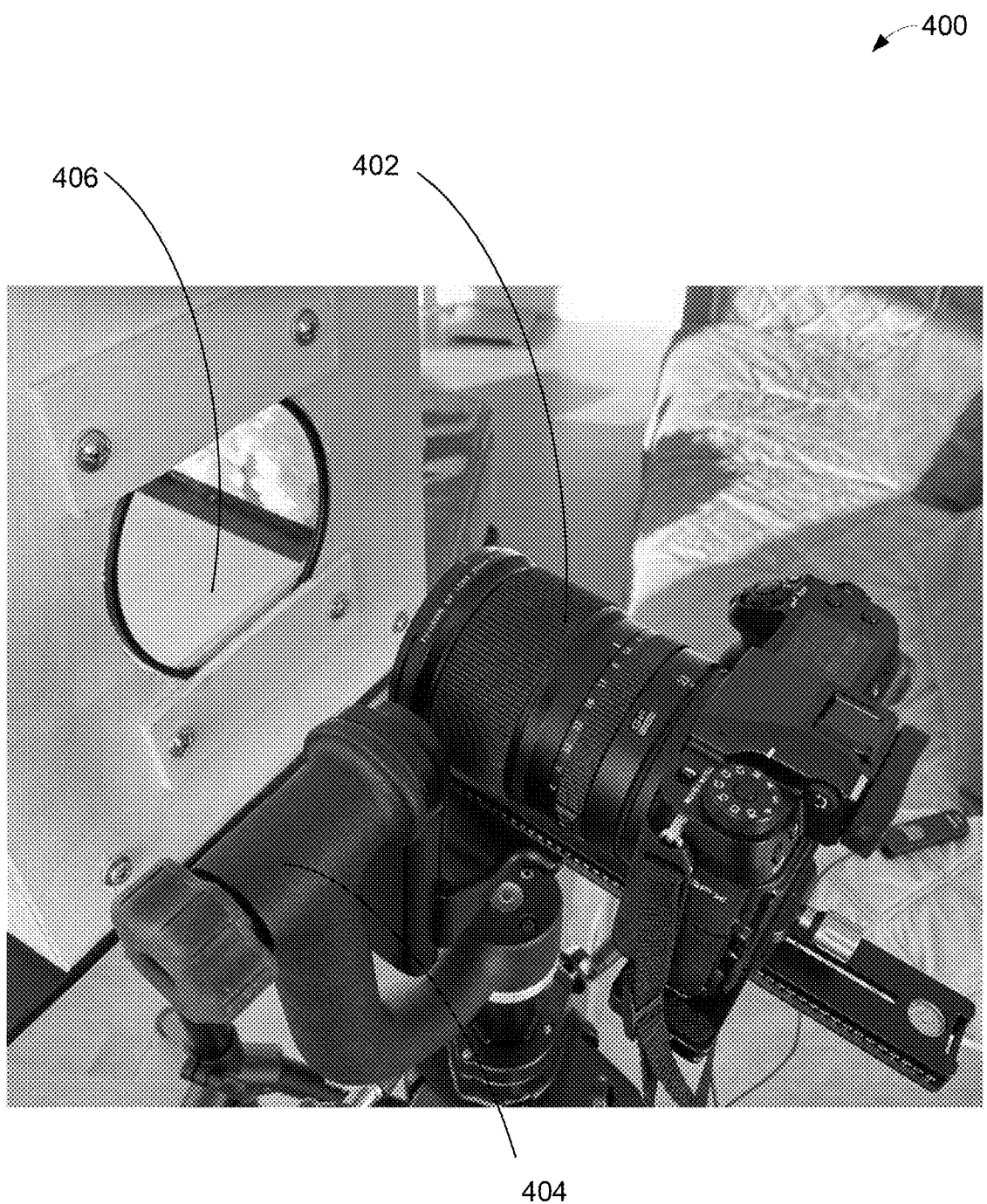
FIG. 4 illustrates a camera mounted on a gimbal with an auxiliary lens.

FIG. 4 illustrates, generally at 400, an embodiment showing a camera 402 mounted on a gimbal 404 with an auxiliary lens 406. If the two axes of rotation of the gimbal 404 are positioned at the front lens of the camera's (402) lens, the camera 402 will always be 'looking' down the optical axis of the auxiliary lens 406, minimizing the introduction of off axes aberrations of the auxiliary lens 406.

As an example, if the auxiliary lens has a focal length of 4 meters and is positioned 3.8 meters away from the target, the virtual distance of the target seen by the camera is given by this equation:

$$d=(1/3.8-1/4)^{-1}=76 \text{ meters. (Derived from the lens equation.)}$$

For practical purposes testing most lenses at 76 meters is equivalent to testing at a long distance considered to be infinity.

Using the auxiliary lens approach disclosed has the following important advantages:
1) It is possible to effectively (and economically) test at infinity.
2) The focus errors introduced by tilting and swinging the camera to bring the target to a particular place in the field of view shrink dramatically when the focus is on a distant virtual target. The errors of size and aspect ratio are easily corrected in software, as is the longitudinal chromatic aberration of the auxiliary lens. Spherical aberration of the auxiliary lens is negligible due to the large f-number. Off axis aberrations of the auxiliary lens are minimal because all imaging is close to the axis.
3) A short test range can be utilized.

The auxiliary lens (as illustrated in FIG. 4 at 406) generally has an f-number in the range of 15 to 60, such as obtained with commercially available 138 mm diameter lenses with focal lengths of 2, 4, and 8 meters commonly used in the film industry. Because the f-number is large and imaging performed by the auxiliary lens remains very close to the optical axis, on axis and off axis aberrations are minimal. If the auxiliary lens is a simple lens rather than an achromatic lens there will be chromatic aberration. The focal length of the auxiliary lens will be spread out due to dispersion approximately ½ percent. The combination of the auxiliary lens and the camera lens will create an image on the camera sensor where only one wavelength of light is in perfect focus and other wavelengths are focused in front of or behind the sensor surface. This will create a reduction in resolution measured at target edges due to chromatic aberration associated with the auxiliary lens. Depending on the details of a particular measurement, this effect may be negligible, correctable in software, or amenable to correction by manipulating the spectrum of the target illumination. The same techniques designed to handle chromatic aberration from the auxiliary lens can be placed into service to measure chromatic aberration in the camera lens.

If an auxiliary lens is not available, perhaps because a customer wants to perform one or a few tests and does not want to incur the expense of the auxiliary lens, approaches may be used to correct the focus errors due to tilt and swing. The focus error is a function of the angle the camera is tilted measured from the line from the camera to the target. To correct the error the following choices exist:
1) The user can refocus when the zone of focus changes (i.e. when the distance from the center of the field changes.
2) The user can move the camera and tripod toward or away from the target by a calculated distance to change focus.
3) The camera can be commanded, under computer control, to change focus by a calculated number of steps of the focus motor.

These approaches also apply if it is desired to test the camera focused too close to the camera to be corrected by the use of the auxiliary lens.

Presentation of Results

In order to provide a simple and easy to understand summary of the quality of the lens and camera combination the following novel approach is used.

For each positioning of the target in the field of view a "lens plot" is created. The lens plot is the circular bullseye optionally accompanied by an image. A complete display is a summary of the positions where the target was positioned showing inside a drawn frame representing the edge of the field of view.

Figure 5:
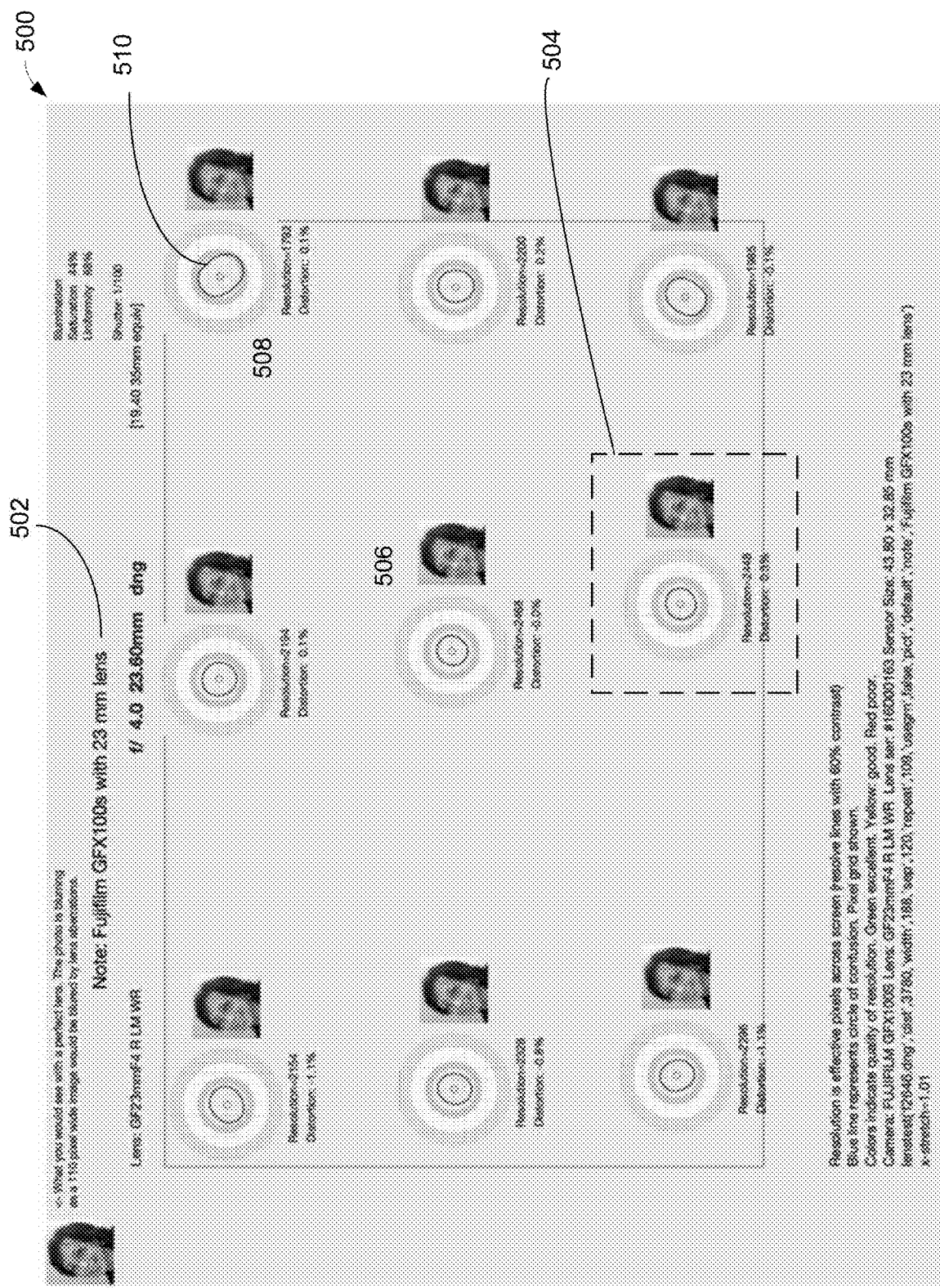
FIG. 5 illustrates a summary lens plot.

FIG. 5 illustrates, generally at 500, an embodiment showing a summary lens plot for a high-quality, wide angle lens on a medium format camera as noted at 502. The resolution number printed under each lens plot (as a representative example at 504 within the dashed box) is indicative of how many pixels across the screen are sharply separate from adjacent pixels. There are various ways to indicate resolution and this one is easy to understand. Here ate 504 can be seen that the Resolution=2448 and the Distortion: 0.3%.

The best resolution is 2488 in the center (denoted by 506) and the worst is 1792 in the upper right corner (denoted by 508). The asymmetry of the resolution about the center indicates a lack of parallelism between the lens and the sensor. This can be caused by misalignment of lenses or mechanical misalignment of the mating flanges of the lens and camera, for a removable lens. The blue line drawn on the lens plot (for representative see 510) indicates the resolution in 18 different directions corresponding to the 18 sides of the nested polygons in the target used. The larger the average radius of the blue line, the worse the resolution.

Resolution can be defined in any number of ways and all give a relative measure of lens quality. For example, in the presentation resolution is the total number of resolved lines across the horizontal width of the picture. The resolution criteria is that contrast between adjacent black and white lines be 60%.

Distortion is change in magnification relative to the center of the photo. A perfect lens has no distortion and no change in magnification.

Figure 6:
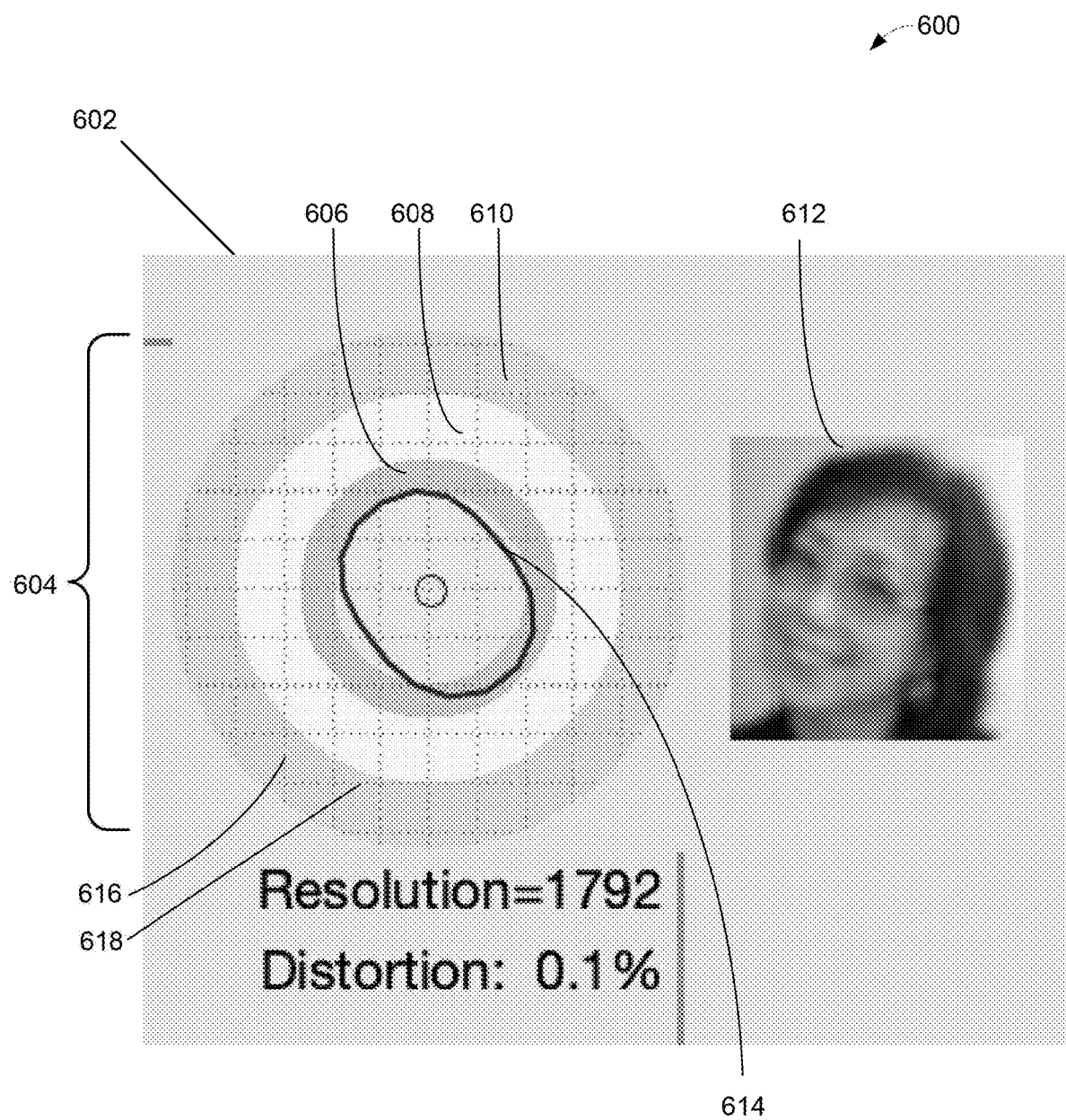
FIG. 6 illustrates an enlarged view of a lens plot.

FIG. 6 illustrates, generally at 600, an embodiment showing an enlarged view of the lens plot 602 as shown in the upper right corner of FIG. 5 at 508.

The bullseye 604 has colored zones, green 606, yellow 608, and red 610 in analogy with traffic lights. If the blue line falls in the green zone 606, or even inside the green zone 606, resolution is considered excellent. In the yellow zone 608, resolution is considered fair, and in the red zone 610 poor. The picture of the woman's face 612 is an indication of how much blurring would occur at this position in the field of view relative to a reference unblurred photo.

Figure 7:
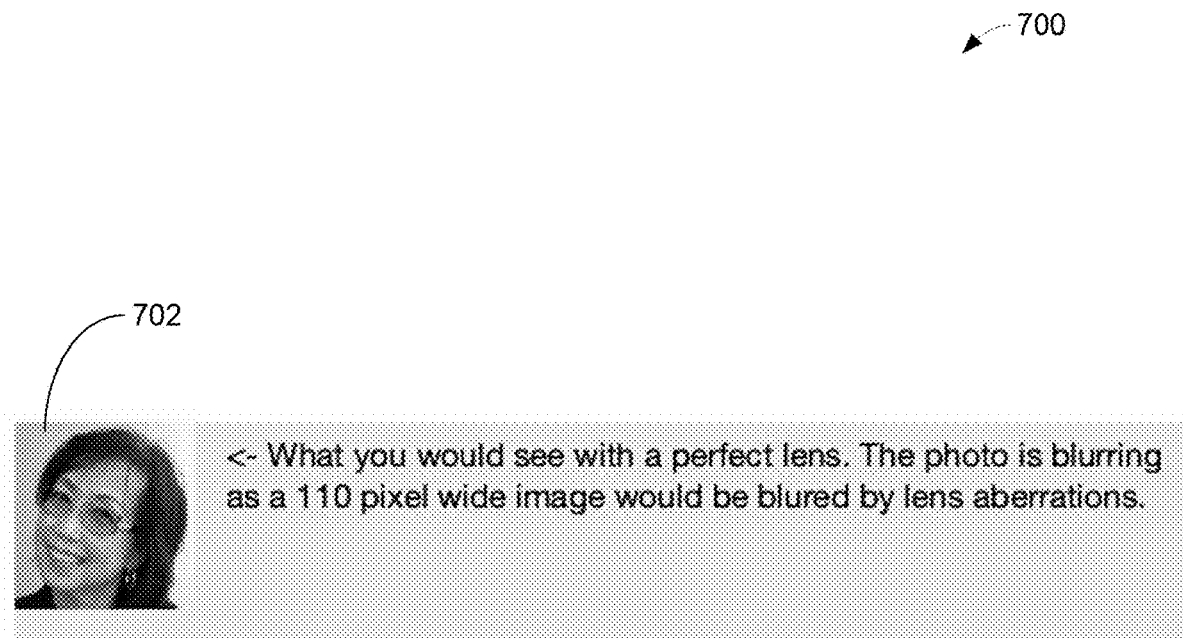
FIG. 7 illustrates an enlarged view of a reference unblurred photo.

FIG. 7 illustrates, generally at 700, an embodiment showing an enlarged view of a reference unblurred photo 702.

The reference unblurred photo is an optional choice because the user can provide his/her own photo. If the blue line is stretched in one direction that indicates resolution varies according to the direction in which it is measured.

The blue line, for example represented in FIG. 6 at 614 does double duty because it also schematically represents the circle of confusion. The circle of confusion is the image of a point. An idealized lens would focus a point source, such as a star in a single point on the sensor. In the real world the star ends up as a blurry circle (or ellipse or irregular shape) where most of the light is concentrated. The bigger the circle of confusion the worse the resolution of the lens. There is not a universally accepted method of defining the circle of confusion. Our definition is the circle (or ellipse or irregular shape) enclosing 80% of the light energy. The circle of confusion can be irregular due to noise or irregularities in the lens.

The dotted grid over the bullseye represents the pixels on the sensor (not the effective pixels used to define resolution). The dotted grid, for example as shown in FIG. 6 at 616 representative of vertical grid lines, and 618 representative of horizontal grid lines, shows the size of the pixels in relation to the representation of the circle of confusion. It is not an illustration of any particular pixels on the sensor.

In addition, distortion and focal length of the lens (focal length usually deviates somewhat from the nominal value), are also measured.

What is claimed is:

1. A method for testing a lens and camera combination:
tilting and swinging the lens and camera combination to position a test target at different positions in the lens and camera combination field of view;
wherein the tilting and swinging the lens and camera combination is performed with the lens and camera combination mounted on a gimbal and wherein axes of the gimbal cross at a center of a front glass of the lens;
further comprising using an auxillary lens placed in front of the lens and camera combination but not attached to the lens and camera combination wherein the auxillary lens creates a virtual image effectively at up to an infinite distance from the lens and camera combination, allowing testing the lens and camera combination to take place with the lens and camera combination focused near infinity;
wherein an optic al axis of the auxiliary lens is aliened with the front glass of the lens; and
wherein the auxiliary lens is of a long focal length (2-8 meters inclusive) with a large f-number (15-60) and operates substantially close to the optical axis of the lens and camera combination, thereby minimizing aberrations introduced by the auxiliary lens.

2. The method of claim 1 wherein the test target consists of nested polygons.

3. The method of claim 1 presenting results of the testing the lens and camera combination includes a snapshot showing relative blurring introduced by the lens and camera combination at a particular position in a field of view of the lens and camera combination.

4. The method of claim 3 further comprising a bullseye style presentation showing resolution measured in various directions of the lens and camera combination combined with a circle of confusion and a grid representing camera sensor pixels.

5. The method of claim 4 wherein the bullseye style presentation further comprises a green zone, a yellow zone, and a red zone.

6. The method of claim 5 further comprising an indication of resolution and distortion.

* * * * *

UNITED STATES PATENT AND TRADEMARK OFFICE
CERTIFICATE OF CORRECTION

| | |
|---|---|
| PATENT NO. | : 11,758,122 B1 |
| APPLICATION NO. | : 18/145365 |
| DATED | : September 12, 2023 |
| INVENTOR(S) | : Norman Rogers |

Page 1 of 1

It is certified that error appears in the above-identified patent and that said Letters Patent is hereby corrected as shown below:

In the Claims

Claim 1, Line 17 (Column 6 Line 27):
Change "optic al" to --optical--

Claim 1, Line 17 (Column 6 Line 27):
Change "aliened" to --aligned--

Signed and Sealed this
Twenty-fourth Day of October, 2023

Katherine Kelly Vidal
*Director of the United States Patent and Trademark Office*